W. G. CLARK.
GEOGRAPHICAL POSITION INDICATOR.
APPLICATION FILED JUNE 28, 1911.

1,077,596.

Patented Nov. 4, 1913.

3 SHEETS—SHEET 1.

Witnesses:
A. E. Parham
M. M. Pimann

Walter G. Clark, Inventor
By his Attorney
Herbert H. Ogden

W. G. CLARK.
GEOGRAPHICAL POSITION INDICATOR.
APPLICATION FILED JUNE 28, 1911.

1,077,596.

Patented Nov. 4, 1913.
3 SHEETS—SHEET 2.

Witnesses:
A. E. Parham
M. M. Riemann

Walter G. Clark, Inventor
By his Attorney
Herbert G. Ogden

W. G. CLARK.
GEOGRAPHICAL POSITION INDICATOR.
APPLICATION FILED JUNE 28, 1911.
1,077,596.
Patented Nov. 4, 1913.
3 SHEETS—SHEET 3.
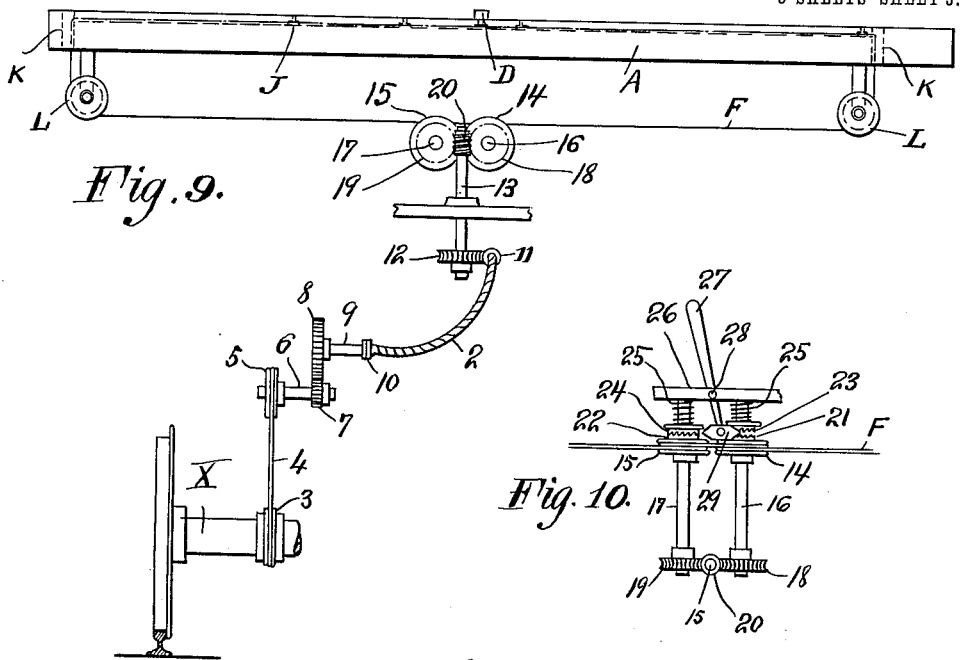
Fig. 9.
Fig. 10.
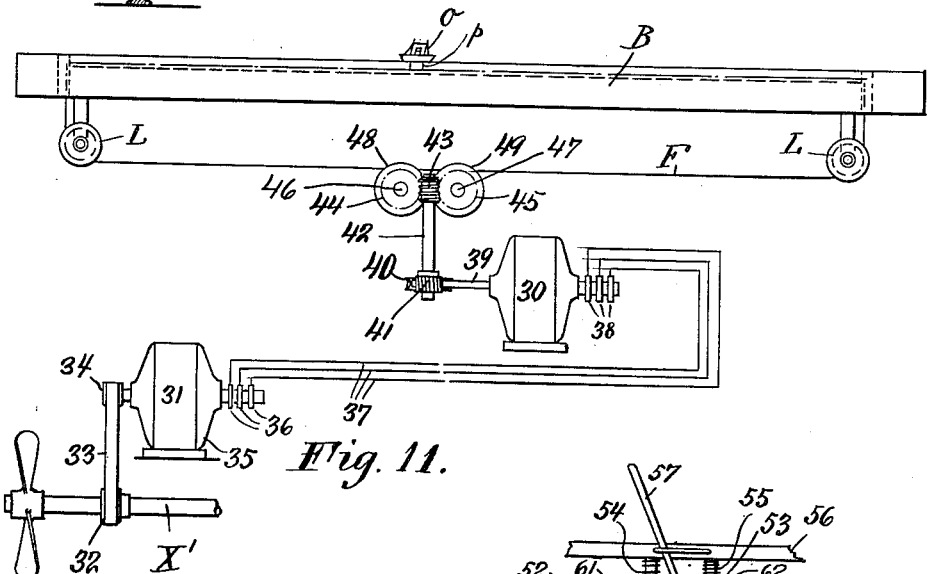
Fig. 11.
Fig. 12.
Witnesses:
A. B. Parham
M. M. Riemann
Inventor
Walter G. Clark
By his Attorney
Herbert M. Ogden

UNITED STATES PATENT OFFICE.

WALTER G. CLARK, OF NEW YORK, N. Y.

GEOGRAPHICAL-POSITION INDICATOR.

1,077,596.   Specification of Letters Patent.   Patented Nov. 4, 1913.

Application filed June 28, 1911. Serial No. 635,780.

*To all whom it may concern:*

Be it known that I, WALTER G. CLARK, a citizen of the United States, and a resident of the borough of Manhattan, city, county, and State of New York, have invented certain new and useful Improvements in Geographical-Position Indicators, of which the following is a specification accompanied by the drawings.

This invention relates to an indicating device intended for installation on railway cars, steamships, or other moving vehicles for the purpose of indicating the geographical position of the vehicle and also the rate of travel.

The object of the invention is to afford simple and convenient means capable of ready inspection for graphically representing the location of the vehicle at all times on the route traveled, also for indicating the speed at which the vehicle is traveling, and the number, location and duration of all stops.

Another object is to acquaint the tourist with the physical characteristics along the route traveled.

To these ends the invention consists of a geographical indicator substantially as hereinafter fully described and claimed in this specification and embodied in its preferred forms in the accompanying drawings, in which—

Figure 1:
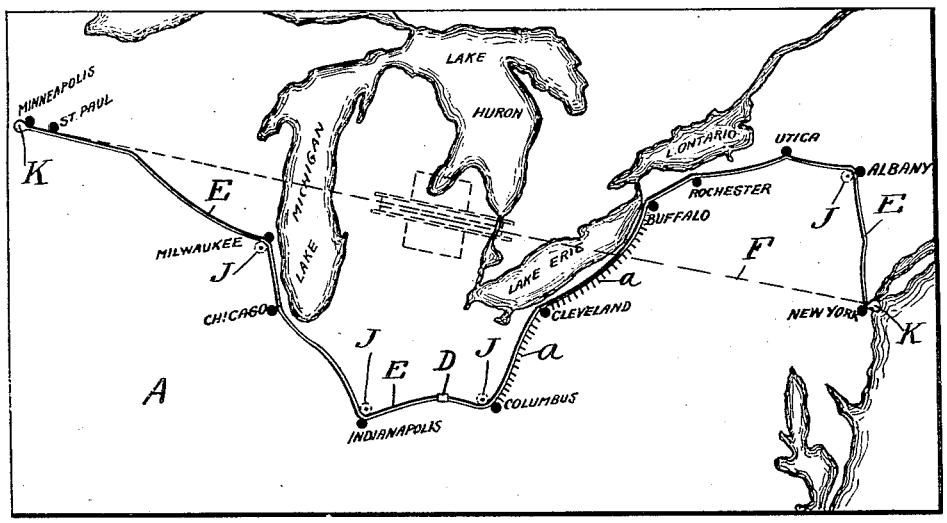
Figure 2:
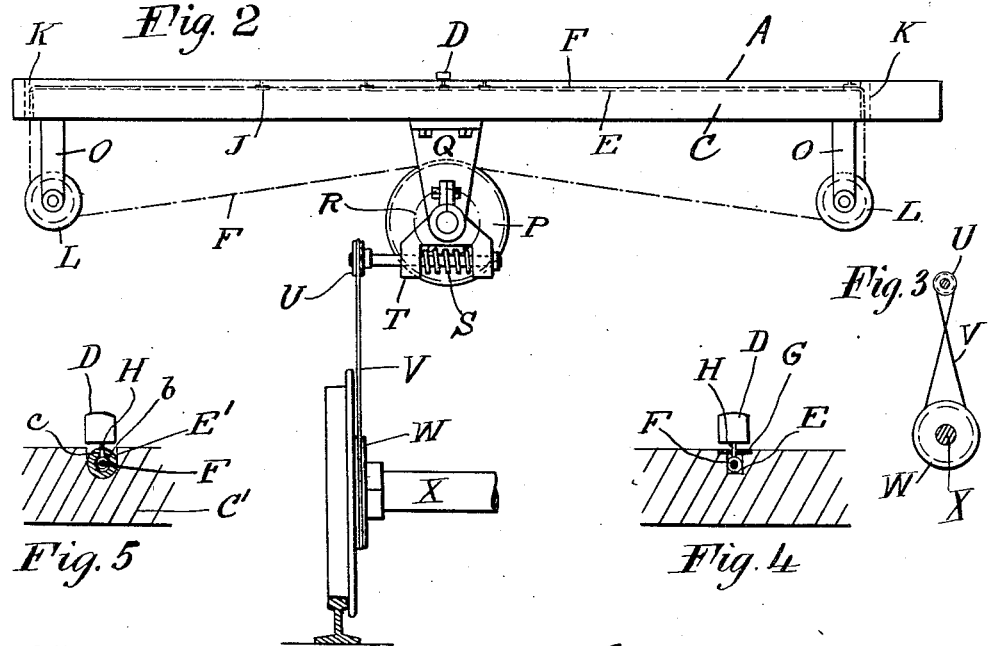
Figure 6:
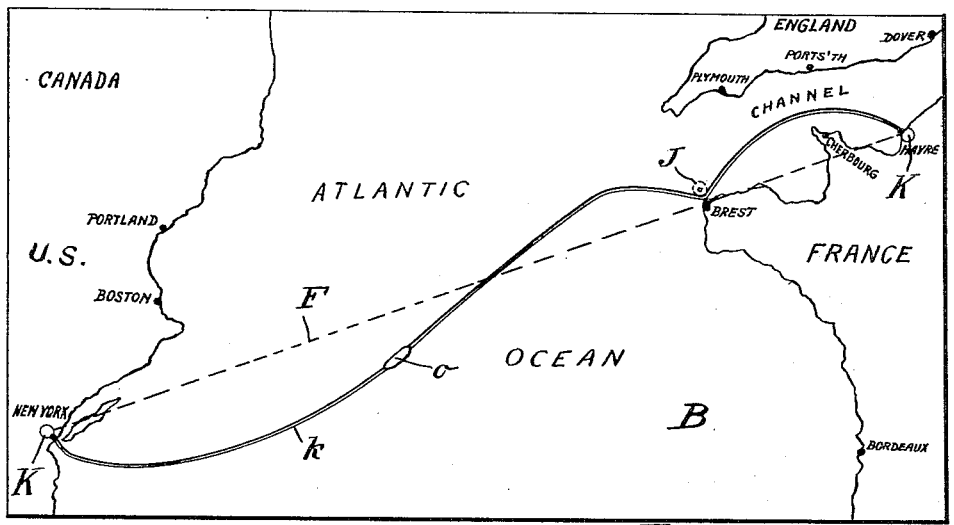
Figure 7:
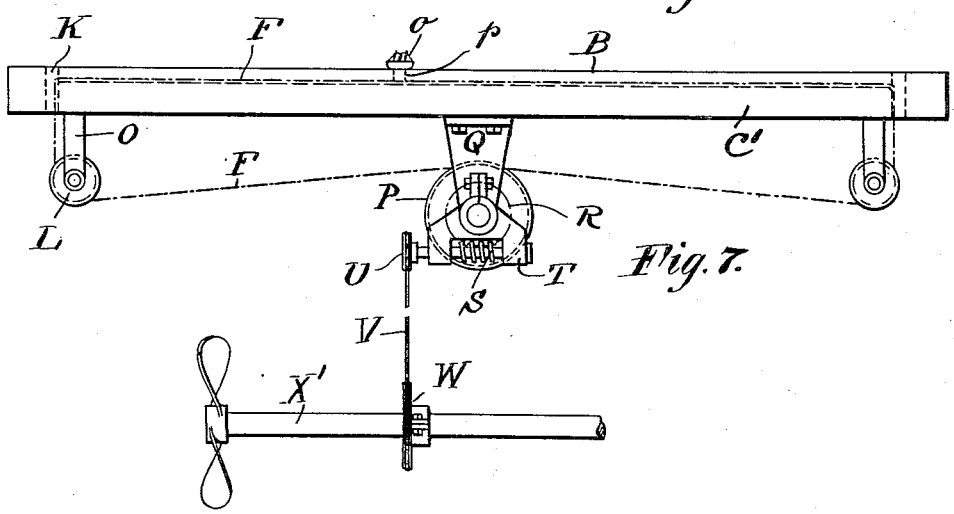
Figure 8:
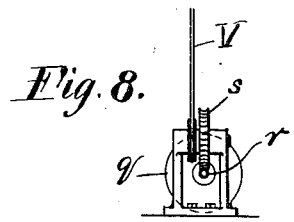

Figure 1 is a plan view of a device for carrying out the invention; Fig. 2 is a side elevation of the device shown in Fig. 1 and connected to be actuated from the axle of a car; Fig. 3 is a detail end elevation of the driving connections partly in section, showing the belt crossed as a means for reversing the direction of movement of the indicator; Fig. 4 is an enlarged detail fragmentary transverse sectional view taken through a portion of the device, showing one form of traveling indicating means; Fig. 5 is a similar view showing a modified construction of traveling indicating means; Fig. 6 is a plan view of a device embodying the invention adapted to be applied to a vessel and indicating a route of ocean travel; Fig. 7 is a side elevation of the device shown in Fig. 7 and connected to be actuated from the propeller shaft; Fig. 8 is a detail end elevation of a motor adapted to be placed in any desired position on ship board for actuating the device; Fig. 9 is a side elevation of a modification of the device shown applied to a car and connected to be actuated from the axle of the car; Fig. 10 is a detail top plan view of a reversing mechanism; Fig. 11 is a diagrammatic side elevation of a modification of the device adapted to be applied to a ship and connected to be actuated from the propeller shaft; and Fig. 12 is a detail top plan view of a modified form of reversing mechanism.

Instead of being under the necessity of referring to a time table or guide book, in order that a tourist or traveler may determine the position on the map or chart of a moving vehicle, as a railway train or vessel, I have devised a geographical position indicator adapted to be supported in such position that it may be viewed by the traveler at any time, who may thus determine at a glance the position of the vehicle on the map, and the route of travel of the vehicle.

In the case of a railway car, the device is adapted to be mounted in a car or in the observation portion of a car and connected to be operated from a moving part of the vehicle, as the car axle. In the case of a steamship, the device may be mounted in any suitable position, where it may be viewed by the passengers and connected to be operated from a moving part of the ship machinery, as the propeller shaft.

In connection with the map or chart of the route, the device is provided with an indicator suitably guided along the route of travel of the vehicle and operatively connected to move at a rate proportionate to the travel of the vehicle, so that the indicator shows not only the position of the vehicle, recording all stops and the duration thereof, but indicates the rate of travel in passing over the scale of miles which may be provided along the route.

In the drawings I have shown a map A or an ocean chart B suitably mounted upon a support or frame C which in this instance is shown in the form of a table or board, although I am not to be understood as limiting the invention to a map or chart provided upon a plane surface. Other surfaces or supports may be provided as desired. The drawings represent the device for convenience of illustration and said support or table C may be arranged horizontally or vertically.

In Fig. 1, the map shows a railway route from New York to Minneapolis, for instance, and in order to guide and move an indicator D along the route, the board or table C is conveniently provided with a groove or guideway E following the route of the railway through the various stations indicated on the drawing. The cord F or other continuously traveling means lies in the groove or guideway E and said groove may be covered by a plate or plates G (Fig. 4) slotted to receive the tongue H of the indicator D, which tongue is fastened to the indicator and mounted on the cord F. Guide rollers J may be provided suitably mounted on the board alongside the guideway at those portions of the route which form bends of sufficient angle to otherwise bind the moving cord in the groove.

The cord F as shown in this instance, passes through apertures K in the support at the terminals of the route indicated by the words "New York" and "Minneapolis" and is guided over the end guide rollers L carried by the brackets O, in planes extending at substantially right angles to the plane of the frame or support. Suitable driving connections for the cord F are shown, which may consist of a grooved drum or pulley P mounted in the bracket Q over which pulley the cord F is passed. The pulley P may be provided with the gear R meshing with the worm S mounted in the depending portion T of the bracket Q. The worm S may be provided with the pulley U connected by the belt V with the pulley W on the axle X of the car. It is to be understood that any other suitable reduction gearing may be provided for operating the cord F. Obviously, the indicator D will travel along the groove E when the car is moving and if the car starts at the position indicated by "New York", the indicator will move along the route starting and stopping with the car and moving at a speed proportionate to the car. Preferably indications represented at *a* may be provided along the route to show the distance between stops, so that the speed of the car can be determined as the device is operating. After the car has reached the end of its route, for instance, at Minneapolis, and is started back on the return trip, means are provided for reversing the direction of movement of the indicator D, in order that it may travel in the opposite direction along the route. The driving belt V between the axle and the pulley U on the worm S may be crossed as shown in Fig. 3, in which case the direction of rotation of the worm S will be reversed, although any other suitable reversing connections may be provided.

In Fig. 5, a modification of the device is shown, in which the table or support C' is provided with a groove E' having a tube *b* arranged therein. This tube forming a guideway may be of any suitable material and is provided with a slot *c* to receive the pin H supporting the indicator D. The cord or belt F lies in the tube or guideway *b* so that the indicator is guided along the route.

In Fig. 6, an ocean chart B is mounted on the support C' and the groove or guideway *k* indicates the route of a steamship from New York to Havre. The cord F travels in the guideway *k* and the indicator in this instance represents a ship *o* in miniature suitably connected to the cord F as by means of the connecting piece *p* extending through the groove *k*. The remainder of the construction of the device shown in Figs. 6 and 7 is substantially like that shown in Figs. 1 and 2, except that the pulley W is mounted on the propeller shaft X' of the ship. The indicating device *o* in the form of a miniature ship is guided and travels along the steamship route on the chart B proportionately to the speed of the ship.

If desired, a separate motor *q* indicated in Fig. 8, may be provided in the pilot house or at any convenient location in the ship and connected to operate the device. This motor *q* may be provided with reduction gearing in the form of a worm *r* and gear *s* for driving the belt V, said belt being adapted to be connected to the pulley U on the worm S. The belt V may be crossed to reverse the movement of the indicator *o*, or the motor may be reversed or any other suitable device may be provided for reversing the travel of the indicator *o* when the ship is returning on the route. The motor *q* should be so constructed and devised and the driving constructions should be such that the indicator *o* will be moved along the route indicated on the chart B at a speed proportionate to the travel of the ship.

In the modification of the invention shown in Figs. 9 and 10 X represents the car axle as before, and means are provided embodying a flexible shaft or connection 2 for transmitting motion from the car axle to the cord F carrying the indicator D. The car axle may be provided with the grooved pulley 3 connected by rope or belt 4 with the grooved pulley 5 on the counter-shaft 6. Said counter-shaft is provided with the pinion 7 meshing with the gear 8 on the driven shaft 9, which shaft is connected by a suitable coupling 10 with the flexible connection 2 connected to rotate the worm 11 meshing with the worm wheel 12 on the vertical shaft 13. In this modification, the cord F passes around the grooved pulleys 14 and 15 loose upon the shafts 16 and 17 respectively. These driven shafts 16 and 17 are provided with worm wheels 18 and 19 meshing with the worm 20 on the vertical shaft 13, so that rotation of the shaft 13 and worm 20 continuously rotates the worm wheels 18 and 19 in opposite directions. The shafts 16 and 17 are therefore rotating continually in opposite directions when the car is traveling, and clutch mechanism is provided for connecting loose pulley 14 to shaft 16, and for connecting loose pulley 15 to shaft 17. One pulley is traveling loosely on its shaft, while the other is rotating with its shaft and by this means the direction of movement of the cord F is controlled, and reversed in accordance with the direction of travel of the car. The loose pulleys 14 and 15 are provided with the toothed clutch members 21 and 22, meshing respectively with the toothed clutch members 23 and 24 rotatable with the shafts 16 and 17 respectively, but slidable thereon, as by means of suitable feathers (not shown). Suitable compression springs 25 are provided between the clutch members 23 and 24 and the frame 26. A hand operating lever 27 is pivoted at 28 upon the frame 26 and is provided at its inner end with the clutch operating member 29 in the form of a double wedge adapted to enter between one or the other of the sets of clutch members and permit one pair of clutch members to remain in operative engagement while the other pair of clutch members are separated.

In the position of the parts shown in Fig. 10, the clutch members 22 and 24 are shown in operative engagement, while the clutch members 21 and 23 are separated. The shaft 17 is driving the clutch member 24, which in turn is rotating the pulley 15, while pulley 14 is loose upon its shaft. The cord F is therefore traveling in a given direction. By moving the hand lever 27 upon its pivot, obviously the direction of movement of the cord F will be reversed.

In the modification shown in Fig. 11, electrical transmission means are shown between the propeller shaft X' of a ship and the indicating device, which may be located in the pilot house. An electrical transmission system is used, preferably embodying a synchronous motor 30 and an alternating current generator 31 connected to be driven from the propeller shaft X' or other moving part of a ship's machinery. By this means the proper speed ratio may be obtained between the driving and driven parts of the apparatus. The propeller shaft may be provided with the pulley 32 connected by belt 33 to the pulley 34 on the rotor shaft of the three phase alternating current generator 31, of which the stator is represented at 35. The slip rings 36 are connected by the three wires 37 with the slip rings 38 on the armature shaft of the synchronous motor 30, which may be separately excited if desired, in any suitable manner (not shown). The armature shaft 39 of the motor, as shown, is provided with the worm 40 meshing with the worm wheel 41 on the vertical shaft 42 carrying the worm 43 at its other end, meshing with the worm wheels 44 and 45 on the shafts 46 and 47 respectively. The grooved pulleys 48 and 49 over which the cord F passes, are loose upon the shafts 46 and 47 respectively and provided with clutch members 50 and 51 adapted to coöperate with the clutch members 52 and 53 respectively, rotatable with the shafts 46 and 47, but slidable thereon, as by means of feathers (not shown). The clutch members 52 and 53 are provided with compression springs 54 and 55 between said members and the frame 56. A hand operating lever 57 is pivoted at 58 to any suitable part of the car frame and provided with arms 59 and 60, extending into operative relationship with flanges 61 and 62 on the clutch members 52 and 53, so that as the lever 57 is rocked upon its pivot, one or the other of the clutch members 52 or 53 is maintained in engagement with one of the members 50 or 51.

Obviously, the different constructions and modifications of the invention shown in the drawings may be combined as desired in one structure, it being understood that the drawings are merely illustrative of suitable devices for carrying out the invention. The clutch operating mechanisms shown in Figs. 10 and 12 may, if desired, be combined with constructions such as shown in Figs. 2 and 7, by using two pulleys instead of one pulley P, as shown in said figures.

I claim and desire to obtain by Letters Patent the following:

A device for continuously indicating both the geographical position and rate of travel of a moving vehicle, comprising a support or frame, a map or chart mounted on said support, said support having a groove following a definite route on the map, guide rollers at each end of the groove, intermediate guide rollers alongside the groove along its length, an endless cord or connector lying in the groove and passing over said end rollers and intermediate rollers, forming a driving length extending across the back of the board directly connecting the said end rollers, an indicator connected to said cord and traveling in the groove, driving devices operatively connected to the said driving length of the cord, means for continuously driving said devices from the driving connections of the vehicle without stoppage or intermission at a rate proportionate to the speed of the vehicle, indications along the route on the map representing the scale of distances traveled, whereby the continuous rate of travel of the vehicle as well as its geographic position are constantly indicated to the observer, and means for reversing the continuous operation of the said driving devices to which the endless cord is operatively connected to reverse the travel of the cord.

In testimony whereof I have signed this specification in the presence of two subscribing witnesses.

WALTER G. CLARK.

Witnesses:
 HENRY SHELDON,
 M. M. RIEMANN.